(12) United States Patent
Chung et al.

(10) Patent No.: US 10,789,332 B2
(45) Date of Patent: Sep. 29, 2020

(54) APPARATUS AND METHOD FOR LINEARLY APPROXIMATING DEEP NEURAL NETWORK MODEL

(71) Applicant: Electronics and Telecommunications Research Institute, Daejeon (KR)

(72) Inventors: Hoon Chung, Daejeon (KR); Jeon Gue Park, Daejeon (KR); Sung Joo Lee, Daejeon (KR); Yun Keun Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/121,836

(22) Filed: Sep. 5, 2018

(65) Prior Publication Data

US 2019/0272309 A1 Sep. 5, 2019

(30) Foreign Application Priority Data

Mar. 5, 2018 (KR) .......................... 10-2018-0025816

(51) Int. Cl.
*G06F 17/17* (2006.01)
*G06N 3/04* (2006.01)

(52) U.S. Cl.
CPC .......... *G06F 17/17* (2013.01); *G06N 3/0481* (2013.01)

(58) Field of Classification Search
None
See application file for complete search history.

(56) References Cited

U.S. PATENT DOCUMENTS

| 2014/0142929 | A1 | 5/2014 | Seide et al. |
| 2014/0279778 | A1* | 9/2014 | Lazar ................... G06N 3/02 706/22 |
| 2015/0019214 | A1* | 1/2015 | Wang ..................... G10L 15/34 704/232 |
| 2016/0078863 | A1 | 3/2016 | Chung et al. |
| 2017/0206894 | A1 | 7/2017 | Kang et al. |

OTHER PUBLICATIONS

Kaiming He et al., "Delving Deep into Rectifiers: Surpassing Human-Level Performance on ImageNet Classification"; arXiv:1502.01852v1 [cs.CV], Feb. 6, 2015, pp. 1-11.

* cited by examiner

*Primary Examiner* — Michael D. Yaary
(74) *Attorney, Agent, or Firm* — Kile Park Reed & Houtteman PLLC

(57) ABSTRACT

Provided are an apparatus and method for linearly approximating a deep neural network (DNN) model which is a non-linear function. In general, a DNN model shows good performance in generation or classification tasks. However, the DNN fundamentally has non-linear characteristics, and therefore it is difficult to interpret how a result from inputs given to a black box model has been derived. To solve this problem, linear approximation of a DNN is proposed. The method for linearly approximating a DNN model includes 1) converting a neuron constituting a DNN into a polynomial, and 2) classifying the obtained polynomial as a polynomial of input signals and a polynomial of weights.

6 Claims, 3 Drawing Sheets

APPARATUS AND METHOD FOR LINEARLY APPROXIMATING DEEP NEURAL NETWORK MODEL

CROSS-REFERENCE TO RELATED APPLICATION

This application claims priority to and the benefit of Korean Patent Application No. 2018-0025816, filed on Mar. 5, 2018, the disclosure of which is incorporated herein by reference in its entirety.

BACKGROUND

1. Field of the Invention

The present invention relates to an apparatus and method for linearly approximating a deep neural network (DNN) model which is a non-linear function.

2. Discussion of Related Art

In general, DNN is composed of an input layer, a hidden layer, and an output layer as shown in FIG. 1. The hidden layer may be expressed by Equation 1 below.

$$z^0 = x_t$$

$$y_i^{(l+1)} = \sum_{j=1}^{N^{(l)}} w_{ij}^{(l)} z_j^{(l)} + b_i^{(l)}$$

$$z_i^{(l+1)} = \sigma(y_i^{(l+1)}), \quad (1)$$

Affine transformations are performed on a weight matrix W and bias vector b of an input signal $x_t$ to calculate y, and then a non-linear activation function σ is applied to calculate a result value z. In Affine geometry, Affine transformation is a transformation between two Affine spaces for maintaining collinear points. Affine transformation f:A→B corresponds to a transformation $\phi: V_A \to V_B$, $\overrightarrow{PQ} \to \overrightarrow{f(P)f(Q)}$ between two vector spaces suitable therefor (spaces constituted of vectors connecting two points in Affine space), which satisfies linearity.

In the hidden layer, various non-linear functions given below are used.

| Name | Function |
|---|---|
| sigmoid(y) | $\dfrac{1}{1+\exp(-y)}$ |
| tanh(y) | $\dfrac{1-\exp(-2y)}{1+\exp(-2y)}$ |
| ReLU(y) | max(0, y) |
| LReLU(y) | $\begin{cases} y, & \text{if } y > 0 \\ 0.001y, & \text{if } y \leq 0 \end{cases}$ |
| PReLU(y) | $\begin{cases} y, & \text{if } y > 0 \\ \alpha \cdot y, & \text{if } y \leq 0 \end{cases}$ |
| P-sigmoid(y) | $\eta \cdot (1 + \exp(-\gamma y + \zeta))$ |

SUMMARY OF THE INVENTION

In general, a deep neural network (DNN) model shows good performance in the generation or classification task. However, DNN fundamentally has non-linear characteristics, and therefore it is difficult to interpret how a result from inputs given to a black box model has been derived. To solve this problem, the present invention proposes linear approximation of a DNN model.

According to an aspect of the present invention, there is provided a method of linearly approximating a DNN model, the method comprising: a first operation of expanding an input to a neuron of a DNN into a polynomial; a second operation of approximating the neuron of the DNN with a Taylor series in parallel with the polynomial expansion of the input; and a third operation of classifying the polynomially expanded input and the Taylor-series approximated neuron as a polynomial of input signals and a polynomial of weights.

An input which is expanded into a polynomial by performing a polynomial expansion on an input x is p(x). When the input p(x) is approximated with a Taylor series, a non-linear activation function $$y = \tanh(h) \approx h - \frac{1}{3}h^3$$

is obtained, and also it is possible to obtain a polynomial $$y = (w_1 x_1 + w_2 x_2) - \frac{1}{3}(w_1 x_1 + w_2 x_2)^3$$
$$= w_1 x_1 + w_2 x_2 + -$$
$$w_1^2 w_2 x_1^2 x_2 - w_1 w_2^2 x_1 x_2^2 -$$
$$\frac{1}{3} w_1^3 x_1^3 - \frac{1}{3} w_2^3 x_2^3$$

therefrom.

The third operation of classifying the polynomially expanded input and the Taylor-series approximated neuron as the polynomial of input signals and the polynomial of weights may include converting the polynomial $$y = (w_1 x_1 + w_2 x_2) - \frac{1}{3}(w_1 x_1 + w_2 x_2)^3$$
$$= w_1 x_1 + w_2 x_2 + -$$
$$w_1^2 w_2 x_1^2 x_2 - w_1 w_2^2 x_1 x_2^2 -$$
$$\frac{1}{3} w_1^3 x_1^3 - \frac{1}{3} w_2^3 x_2^3$$

into the form of equation y=a·p(x). The converted equation has the form of Y=A·P, and as a result, it is possible to linearly approximate a DNN model. Therefore, it is possible to handle the DNN model in the same way as calculating a solution to a general linear system.

In the equation y=a·p(x), p(x) is an $n^{th}$-order polynomial of input signals $p(x)=(1, x_1, x_2, x_1^2, x_1 x_2, x_2^2, x_1^3, x_1^2 x_2, x_2^2, x_1, x_2^3)$, and a weight matrix a is a polynomial of a weight matrix W $$a = \left(0, w_1, w_2, 0, 0, 0, -\frac{1}{3} w_1^3, -w_1 w_2^2, -w_1^2 w_2, -\frac{1}{3} w_2^3\right).$$

According to another aspect of the present invention, there is provided an apparatus for linearly approximating a DNN model, the apparatus comprising: a first means configured to expand an input to a neuron of a DNN into a polynomial; a second means configured to approximate the neuron of the DNN with a Taylor series in parallel with the polynomial expansion of the input; and a third means configured to classify the polynomially expanded input and the Taylor-series approximated neuron as a polynomial of input signals and a polynomial of weights.

The first to third means of the apparatus may be implemented with computing hardware, such as a controller and a processor, including electronic circuits or devices designed to perform signal processing and data computation.

The aforementioned configurations and operations of the present invention will become more apparent through detailed embodiments described below with reference to drawings.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
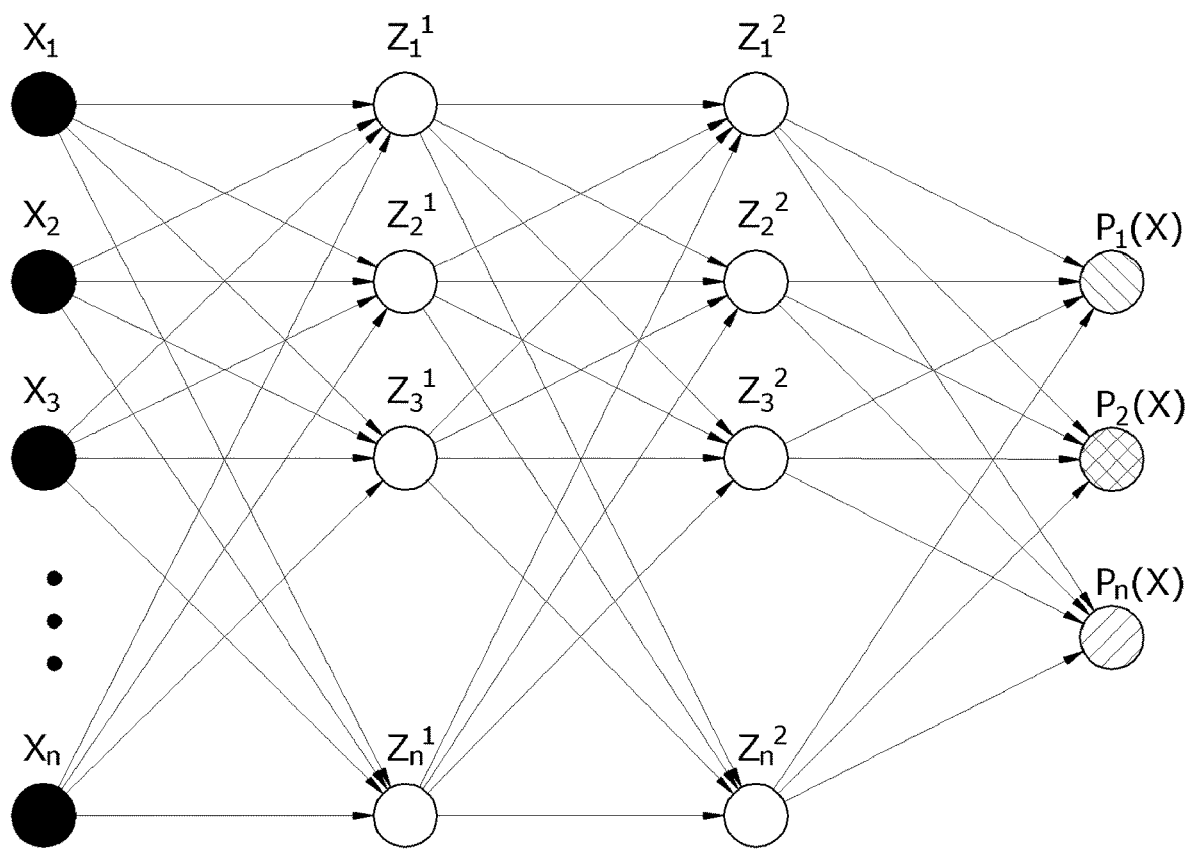
FIG. 1 is a diagram showing a schematic configuration of a conventional deep neural network (DNN)

Inventive advantages and features, and methods of accomplishing the same will become apparent with reference to embodiments described in detail below together with the accompanying drawings. However, the present invention is not limited to embodiments disclosed below, and may be implemented in various forms. Rather, the embodiments are provided so that the present disclosure will be thorough and complete and will fully convey the scope of the invention to those of ordinary skill in the art. The present invention is to only be defined by the appended claims.

The terminology used herein is for the purpose of describing embodiments only, and is not intended to limit the present invention. As used herein, singular terms are intended to include the plural forms as well unless the context clearly indicates otherwise. It will be further understood that the terms "comprise" and "comprising", when used herein, do not preclude the presence or addition of one or more elements, steps, operations, and/or devices other than stated elements, steps, operations, and/or devices.

Hereinafter, exemplary embodiments of the present invention will be described in detail with reference to the accompanying drawings. In the drawings, like elements are denoted by like reference numerals even though the elements are shown in different drawings. When specific description of known configurations or functions related to the description of the present invention may obscure the gist of the present invention, the detailed description will be omitted.

Figure 2:
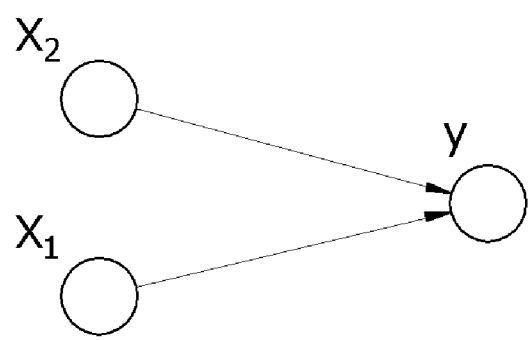
FIG. 2 is a schematic diagram of a neuron having two inputs.

First, to describe exemplary embodiments of the present invention, it is assumed that there is a neuron having two inputs x1 and x2 and an output y as shown in FIG. 2. When signals of the inputs x1 and x2 are input to the neuron, the respective signals are multiplexed by weights and transferred to a next neuron. The next neuron summates the values of the signals, and outputs 1 when the sum exceeds 0 and outputs 0 otherwise. A function of converting the sum of input signals into an output signal is generally referred to as an activation function. In an artificial neural network model, a main function of a neuron is to calculate the weighted sum of inputs and connection strengths and to output the result through the activation function. Therefore, the output of a neuron may vary depending on the selected activation function.

Figure 3:
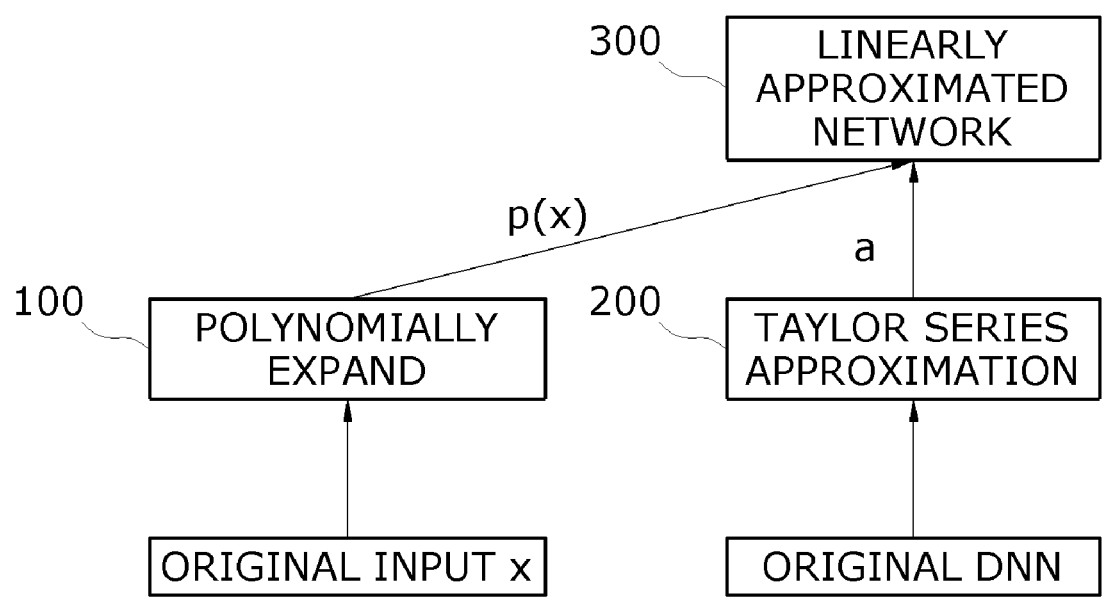
FIG. 3 is a flowchart illustrating a linear approximation method according to an exemplary embodiment of the present invention.

FIG. 3 is a diagram showing a process of linearly approximating the neuron in FIG. 2.

An original initial input x is expanded into a polynomial such that a polynomial p(x) is obtained (100).

In the neuron of FIG. 2, an output h of a hidden layer is calculated as a weighted sum of the two inputs x1 and x2 with weights w1 and w2 as shown in Equation 2.

$$h = w_1 x_1 + w_2 x_2 \quad (2)$$

Referring back to FIG. 3, an original initial DNN neuron is approximated with a Taylor series (200) in parallel with the polynomial expansion (100).

Assuming that tan h(x) is used as a non-linear activation function, the non-linear activation function tan h(x) is approximated with a Taylor series as shown in Equation 3.

$$y = \tanh(h) \approx h - \frac{1}{3} h^3 \quad (3)$$

When Equation 2 is substituted into Equation 3, the neuron of FIG. 2 is expressed in the form of a polynomial as shown in Equation 4.

$$y = (w_1 x_1 + w_2 x_2) - \frac{1}{3}(w_1 x_1 + w_2 x_2)^3 \quad (4)$$
$$= w_1 x_1 + w_2 x_2 + -$$
$$w_1^2 w_2 x_1^2 x_2 - w_1 w_2^2 x_1 x_2^2 -$$
$$\frac{1}{3} w_1^3 x_1^3 - \frac{1}{3} w_2^3 x_2^3$$

When the polynomially expanded p(x) and the Taylor-series approximated neuron are classified as a polynomial of input signals and a polynomial of weights w, the polynomially expanded p(x) and the Taylor-series approximated neuron may be arranged in the form of a linear system as shown in Equation 5.

$$y = a \cdot p(x) \quad (5)$$

Here, p(x) is an $n^{th}$-order polynomial of input signals shown in Equation 6, and a weight matrix a equals a polynomial of an original weight matrix W shown in Equation 7.

$$p(x) = (1, x_1, x_2, x_1^2, x_1 x_2, x_2^2, x_1^3, x_1^2 x_2, x_1 x_2^2, x_1 x_2^3) \quad (6)$$

$$a = \left(0, w_1, w_2, 0, 0, 0, -\frac{1}{3} w_1^3, -w_1 w_2^2, -w_1^2 w_2, -\frac{1}{3} w_2^3\right) \quad (7)$$

As a result of dividing the DNN model of Equation 1 into the $n^{th}$-order polynomial of input signals shown in Equation 6 and the polynomial of the original weight matrix W shown in Equation 7, the DNN model can be linearly approximated into the form shown in Equation 8 below (300).

$$Y = A \cdot P \quad (8)$$

Therefore, it is possible to solve Equation 8 in the same way as calculating a solution to a general linear system.

According to an exemplary embodiment of the present invention, a DNN is linearly approximated and thus can be analyzed in a linear system interpretation method which is being widely used. Also, an exemplary embodiment of the present invention makes it possible to obtain a single-layer system which is different from a DNN, such that training and interpretation thereof are facilitated.

Exemplary embodiments of the present invention have been described above, but those of ordinary skill in the art to which the invention pertains would appreciate that the present invention can be implemented in modified forms without departing from the fundamental characteristics of the invention. Therefore, exemplary embodiments of the present invention should be construed as describing rather than limiting the present invention in all aspects. It should be noted that the scope of the present invention is defined by the claims rather than the description of the present invention, and the meanings and ranges of the claims and all modifications derived from the concept of equivalents thereof fall within the scope of the present invention.

What is claimed is:

1. A method of linearly approximating a model, which is a non-linear function, of a deep neural network (DNN) executing on a processor and comprising an input layer, a hidden layer and an output layer, the method comprising:
    receiving, into the processor, an input to a neuron of the DNN;
    expanding, by the processor, the input to the neuron of the DNN into a polynomial, wherein inputs to the neuron of the DNN are x1 and x2, an output of the neuron of the DNN is y, and weights are w1 and w2;
    approximating, by the processor, the neuron of the DNN with a Taylor series in parallel with the polynomial expansion of the neuron, to obtain a non-linear activation function $$y = \tanh(h) \approx h - \frac{1}{3}h^3,$$

where h is an output of a hidden layer, and $h = w_1 x_1 + w_2 x_2$ is obtained as a result of the approximating the neuron of the DNN with the Taylor series;
    classifying, by the processor, the polynomially expanded input and the Taylor-series approximated neuron as a polynomial of input signals and a polynomial of weights, and acquiring a polynomial $$y = (w_1 x_1 + w_2 x_2) - \frac{1}{3}(w_1 x_1 + w_2 x_2)^3$$
$$= w_1 x_1 + w_2 x_2 + -$$
$$w_1^2 w_2 x_1^2 x_2 - w_1 w_2^2 x_1 x_2^2 -$$
$$\frac{1}{3} w_1^3 x_1^3 - \frac{1}{3} w_2^3 x_2^3;$$

and
    outputting, by the processor, the linearly approximated DNN model for analysis using a linear system interpretation method.

2. A method of linearly approximating a model, which is a non-linear function, of a deep neural network (DNN) executing on a processor and comprising an input layer, a hidden layer and an output layer, the method comprising:
    receiving, into the processor, an input to a neuron of the DNN;
    expanding, by the processor, the input to the neuron of the DNN, wherein an input to the neuron of the DNN is x and an output of the neuron of the DNN is y, into a polynomially expanded input p(x);
    approximating, by the processor, the neuron of the DNN with a Taylor series in parallel with the polynomial expansion of the neuron;
    classifying, by the processor, the polynomially expanded input p(x) and the Taylor-series approximated neuron as a polynomial of input signals and a polynomial of weights, and converting the polynomially expanded input p(x) and the Taylor-series approximated neuron into a form of equation $y = a \cdot p(x)$, where p(x) is an $n^{th}$-order polynomial of input signals, $p(x) = (1, x_1, x_2, x_1^2, x_1 x_2, x_2^2, x_1^3, x_1^2 x_2, x_2^2 x_1, x_2^3)$, and a weight matrix a is a polynomial of a weight matrix W, $$a = \left(0, w_1, w_2, 0, 0, 0, -\frac{1}{3}w_1^3, -w_1 w_2^2, -w_1^2 w_2, -\frac{1}{3}w_2^3\right);$$

and
    outputting, by the processor, the linearly approximated DNN model for analysis using a linear system interpretation method.

3. The method of claim 1, further comprising:
    converting the polynomial $$y = (w_1 x_1 + w_2 x_2) - \frac{1}{3}(w_1 x_1 + w_2 x_2)^3$$
$$= w_1 x_1 + w_2 x_2 + -$$
$$w_1^2 w_2 x_1^2 x_2 - w_1 w_2^2 x_1 x_2^2 -$$
$$\frac{1}{3} w_1^3 x_1^3 - \frac{1}{3} w_2^3 x_2^3$$

into a form of equation $y = a \cdot p(x)$, where p(x) is an $n^{th}$-order polynomial of input signals, $p(x) = (1, x_1, x_2, x_1^2, x_1 x_2, x_2^2, x_1^3, x_1^2 x_2, x_2^2 x_1, x_2^3)$, and a weight matrix a is a polynomial of a weight matrix W, $$a = \left(0, w_1, w_2, 0, 0, 0, -\frac{1}{3}w_1^3, -w_1 w_2^2, -w_1^2 w_2, -\frac{1}{3}w_2^3\right).$$

4. An apparatus including a deep neural network (DNN) executing on a processor and comprising an input layer, a hidden layer and an output layer, for linearly approximating a DNN model which is a non-linear function, wherein the apparatus is configured to:
    receive, into the processor, an input to a neuron of the DNN;
    expand, by the processor, the input to the neuron of the DNN into a polynomial, wherein inputs to the neuron of the DNN are x1 and x2, an output of the neuron of the DNN is y, and weights are w1 and w2;

approximate, by the processor, the neuron of the DNN with a Taylor series in parallel with the polynomial expansion of the neuron, to obtain a non-linear activation function $$y = \tanh(h) \approx h - \frac{1}{3}h^3,$$

where h is an output of a hidden layer and $h=w_1x_1+w_2x_2$ is obtained as a result of approximating the neuron of the DNN with the Taylor series;

classify, by the processor, the polynomially expanded and the Taylor-series approximated neuron as a polynomial of input signals and a polynomial of weights, and acquire a polynomial $$\begin{aligned} y &= (w_1x_1 + w_2x_2) - \frac{1}{3}(w_1x_1 + w_2x_2)^3 \\ &= w_1x_1 + w_2x_2 + - \\ &\quad w_1^2w_2x_1^2x_2 - w_1w_2^2x_1x_2^2 - \\ &\quad \frac{1}{3}w_1^3x_1^3 - \frac{1}{3}w_2^3x_2^3; \end{aligned}$$

and output, by the processor, the linearly approximated DNN model for analysis using a linear system.

5. An apparatus including a deep neural network executing on a processor and comprising an input layer, a hidden layer and an output layer, for linearly approximating a DNN model which is a non-linear function, wherein the apparatus is configured to:

receive, into the processor, an input to a neuron of the DNN;

expand, by the processor, the input to the neuron of the DNN, wherein an input to the neuron of the DNN is x and an output of the neuron of the DNN is y, into a polynomially expanded input p(x);

approximate, by the processor, the neuron of the DNN with a Taylor series in parallel with the polynomial expansion of the neuron;

classify, by the processor, the polynomially expanded input p(x) and the Taylor-series approximated neuron as a polynomial of input signals and a polynomial of weights, and convert the polynomially expanded input p(x) and the Taylor-series approximated neuron into a form of equation $y=a \cdot p(x)$, where p(x) is an $n^{th}$-order polynomial of input signals, $p(x)=(1,x_1,x_2,x_1^2,x_1x_2,x_2^2,x_1^3,x_1^2x_2,x_2^2x_1,x_2^3)$, and a weight matrix a is a polynomial of a weight matrix W, $$a = \left(0, w_1, w_2, 0, 0, 0, -\frac{1}{3}w_1^3, -w_1w_2^2, -w_1^2w_2, -\frac{1}{3}w_2^3\right);$$

and output, by the processor, the linearly approximated DNN model for analysis using a linear system.

6. The apparatus of claim 4, wherein the apparatus is further configured to convert the polynomial $$y = (w_1x_1 + w_2x_2) - \frac{1}{3}(w_1x_1 + w_2x_2)^3 = $$
$$w_1x_1 + w_2x_2 + -w_1^2w_2x_1^2x_2 - w_1w_2^2x_1x_2^2 - \frac{1}{3}w_1^3x_1^3 - \frac{1}{3}w_2^3x_2^3$$

into a form of equation $y=a \cdot p(x)$, where p(x) is an $n^{th}$-order polynomial of input signals, $p(x)=(1,x_1,x_2,x_1^2,x_1x_2,x_2^2,x_1^3,x_1^2x_2,x_2^2x_1,x_2^3)$, and a weight matrix a is a polynomial of a weight matrix W, $$a = \left(0, w_1, w_2, 0, 0, 0, -\frac{1}{3}w_1^3, -w_1w_2^2, -w_1^2w_2, -\frac{1}{3}w_2^3\right).$$

* * * * *